(12) United States Patent
Fairchild

(10) Patent No.: US 7,780,120 B1
(45) Date of Patent: *Aug. 24, 2010

(54) FLIGHT CONTROL METHOD AND APPARATUS TO PRODUCE INDUCED YAW

(76) Inventor: Mark D. Fairchild, 358 Main St., Apt. 4, Royersford, PA (US) 19468

( * ) Notice: Subject to any disclaimer, the term of this patent is extended or adjusted under 35 U.S.C. 154(b) by 0 days.

This patent is subject to a terminal disclaimer.

(21) Appl. No.: 12/364,622

(22) Filed: Feb. 3, 2009

Related U.S. Application Data

(62) Division of application No. 10/711,593, filed on Sep. 28, 2004, now Pat. No. 7,503,527.

(60) Provisional application No. 60/481,941, filed on Jan. 22, 2004.

(51) Int. Cl.
*B64C 3/54* (2006.01)
(52) U.S. Cl. .................. 244/218; 244/199.2; 244/198
(58) Field of Classification Search ............. 244/199.2, 244/99.12, 198, 199.1, 199.3, 218, 219, 90 R, 244/90 A, 45 R
See application file for complete search history.

(56) References Cited

U.S. PATENT DOCUMENTS 1,890,012 A * 12/1932 Alfaro ...................... 244/215
1,947,461 A * 2/1934 de Port ..................... 244/90 R
1,989,291 A * 1/1935 Prewitt ...................... 244/38
2,420,433 A * 5/1947 Kraaymes ................. 244/218
2,550,278 A * 4/1951 Makhonine ............... 244/215
2,565,990 A * 8/1951 Richard ..................... 244/90 R
2,858,091 A * 10/1958 Kapenkin ................. 244/218
4,181,277 A * 1/1980 Gerhardt .................. 244/218
4,247,063 A * 1/1981 Jenkins ...................... 244/91
4,671,473 A * 6/1987 Goodson ................. 244/199.4
4,722,499 A * 2/1988 Klug ....................... 244/199.4
5,634,613 A * 6/1997 McCarthy ............... 244/199.1
5,823,480 A * 10/1998 La Roche ............... 244/199.4
6,098,927 A * 8/2000 Gevers .................... 244/123.8
6,227,487 B1 * 5/2001 Clark ...................... 244/99.12
6,834,835 B1 * 12/2004 Knowles et al. .......... 244/198
2004/0061029 A1 * 4/2004 McCarthy ................. 244/199

OTHER PUBLICATIONS

John D. Anderson, Jr, Fundamentals of Aerodynamics, 1991, McGraw-Hill, Inc., 2nd Edition, p. 333.*

* cited by examiner

*Primary Examiner*—Benjamin P Lee
(74) *Attorney, Agent, or Firm*—John J. Elnitski, Jr.

(57) ABSTRACT

A method of controlling an aircraft in a turn without the use of a rudder by producing induced yaw. Induced yaw being produced by creating a net induced drag differential between an inboard wing to the turn and an outboard wing to the turn, whereby the net induced drag differential overcomes adverse yaw produced by the outboard wing.

15 Claims, 8 Drawing Sheets

FLIGHT CONTROL METHOD AND APPARATUS TO PRODUCE INDUCED YAW

This application is a Divisional application of U.S. patent application Ser. No. 10/711,593, filed on Sep. 28, 2004 and claims the benefit of and incorporates by reference U.S. Provisional Application No. 60/481,941 filed Jan. 22, 2004.

BACKGROUND

The present invention generally relates to flight control dynamics of aircraft. More specifically, the present invention relates to flight control dynamics of aircraft which allows a stable coordinated turn without the use of a rudder.

To perform a stable coordinated turn with a fixed wing aircraft, requires the simultaneous use of a horizontal tail, ailerons, and a rudder. The horizontal tail is used for pitch of the aircraft. The ailerons generates increased lift on the outboard wing of the turn and decreased lift on the inboard wing of the turn. The rudder counterbalances adverse yaw generated by positioning of the ailerons. From aerodynamic theory, it is know that having a finite 3-dimensional airfoil such as a wing in a flow will produce 3-dimensional flow about the airfoil. When freestream air flow encounters a wing, a pressure differential forms between both the top and bottom wing surfaces, which produces lift. The difference in pressure about the wing also causes lateral flow under the wing which curls around the wingtips and creates tip vortices. The tip vortices in turn produce downwash. The downwash has the effect of increasing the local angle of attack about the wing, which creates additional drag. This entire process is known for producing induced drag of an aircraft. It is known that when using an aileron on a wing section, the lift coefficient of the wing section is changed due to movement of the aileron. In effect movement of the aileron changes the shape of the airfoil of the wing section and alters the amount of lift produced. With the increase in lift produced by a wing section due to the change in lift coefficient by the aileron, there is a change in drag on that wing section. With the decrease in lift produced by a wing section due to the change in lift coefficient by the aileron, there is also a change in drag on that wing section. In a banked turn, the outboard wing section experiences an increase in lift and the inboard wing section experiences a decrease in lift. With this, the outboard section experiences an increase in drag greater than the drag observed on the inboard wing section. This difference in drag in relation to each wing section creates the effect of adverse yaw on the wing. It is adverse yaw which requires the use of a rudder to counteract the adverse yaw.

It is an object of the present invention to provide to a flight control means to overcome the requirement of a rudder to make a stable coordinated turn with an aircraft.

SUMMARY OF THE INVENTION

A method of controlling an aircraft in a turn without the use of a rudder by producing induced yaw. Induced yaw being produced by creating a net induced drag differential between an inboard wing to the turn and an outboard wing to the turn, whereby the net induced drag differential overcomes adverse yaw produced by the outboard wing.

DETAILED DESCRIPTION

Figure 1:
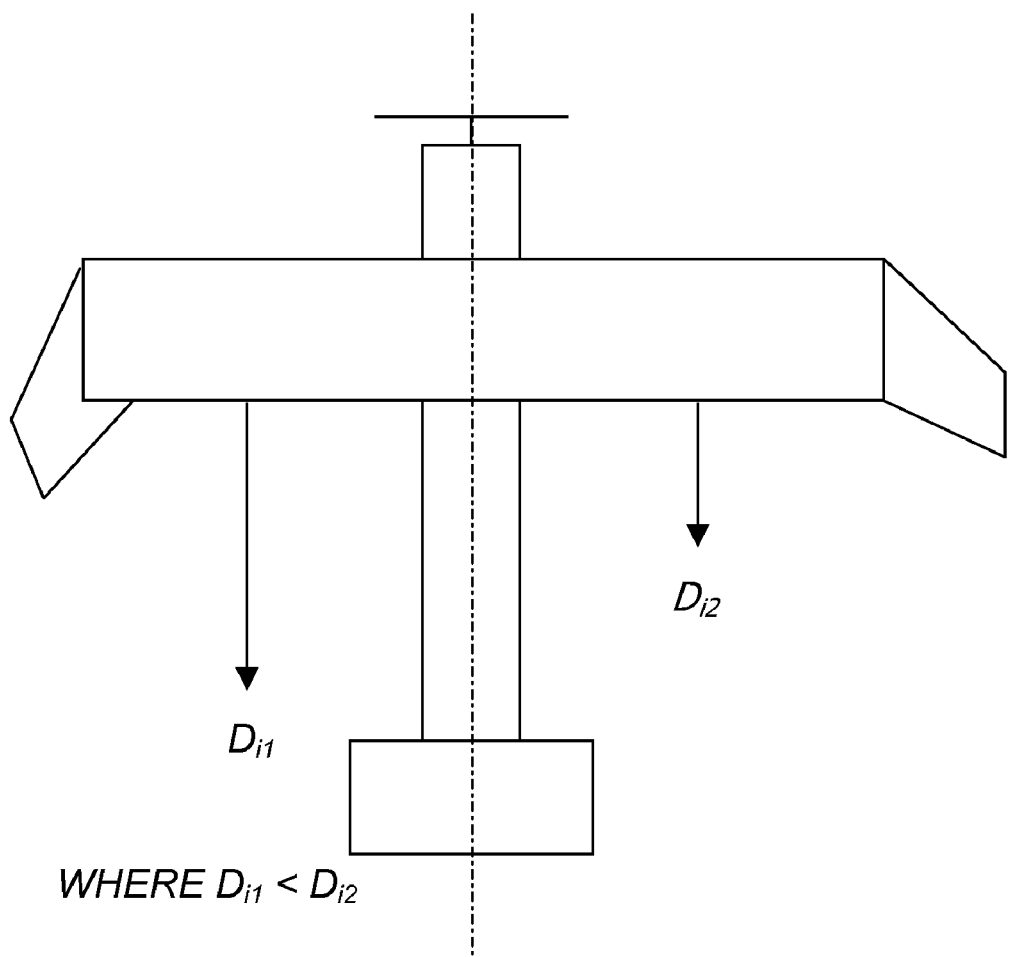
FIG. 1 is a schematic depiction of a flight control means according to the present invention.

The present invention is a flight control method and apparatus to provide aircraft flight control for a stable coordinated turn without the use of a rudder. Using aerodynamic theory, it is known to produce a banked turn by adjusting lift produced on the outboard wing and inboard wing of an aircraft. Typically, some form of aileron on each wing is used to adjust the lift of the outboard and inboard wings during a turn. The aileron is usually a hinged surface in the same coordinate plane as the wing near outside ends of the outboard and inboard wings and along the trailing edge of the outboard and inboard wings. A element which is in the same coordinate plane as the wing is referred to as being coplanar. The hinged aileron surface moves up and down within the air flow over the inboard and outboard wings and such movement changes the lift coefficient of each the inboard and outboard wings. The problem is that by increasing the lift of the outboard wing, the amount drag is increased on the outboard wing and creates adverse yaw. It is the adverse yaw in a turn which requires a vertical tail rudder to counteract the adverse yaw. Part of the increased drag is attributed to the created tip vortex at the outside ends of the wing.

The present invention uses the concept of increasing the effective aspect ratio of the outboard wing to spoil the tip vortex on the outboard wing, to reduce the downwash coming off the outboard wing and reduce the induced drag experienced by the outboard wing. At the same time the present invention uses the concept of decreasing the effective aspect ratio of the inboard wing to increase the tip vortex and increase the induced drag experienced by the inboard wing. The flight control method of the present invention creates a net induced drag differential between the inboard and outboard wings, whereby there is a higher amount of induced drag experienced by the inboard wing than by the outboard wing. The net induced drag differential where the inboard wing experiences more induce drag overcomes the adverse yaw produced by the outboard wing and the wing is therefore producing yaw without the necessity of any vertical control surfaces whatsoever. The present invention defines yaw produced by the net induced drag differential where the induced drag experienced by the inboard wing is greater than by the outboard wing as Induced Yaw. The flight control method of the present invention employs adaptive control surfaces as part of the inboard and outboard wings that can produce both lift and yaw simultaneously, eliminating the need for a rudder.

The present invention would uses control surfaces on the outboard and inboard wings to provide a variable planform to create and utilize Induced Yaw. Induced drag coefficient is computed using the following Induced Drag Coefficient equation.

$C_{Di}=(C_L)^2/(\pi*AR)$, where $C_L$ and AR are the airfoil lift coefficient and wing aspect ratio respectively. A typical wing planform behavior can be described by the Induced Drag Coefficient equation. The flight control method employs adjustable coplanar winglets on the ends of the inboard and outboard wings. The coplanar winglets are independently adjustable in size on each end of the inboard and outboard wings. By increasing the size of the coplanar winglet on the outboard wing, the effective aspect ratio of the outboard wing can be increased, which will in turn lower the induced drag coefficient and the drag experienced by the outboard wing. By decreasing the size of the coplanar winglet on the inboard wing, the effective aspect ratio of the inboard wing is lowered, which increases the induced drag experienced by the inboard wing. Having a larger sized winglet on the outboard wing, as compared to the inboard wing, produces an asymmetric wing with a net induced drag differential.

Since induced drag is the product of a 3 dimensional wing, it makes sense that changing the shape of the wing will change the amount of induced drag. However, the Induced Drag Coefficient equation was derived for a symmetric wing planform, as asymmetric wings have not been of interest to researchers. Wind tunnel tests show that induced drag is not simply a function of the wing aspect ratio, but the effective aspect ratios of each wing half. This is to say that if the planform is varied disproportionately and hence the effective aspect ratio is varied, it will be observed that there are differing drag characteristics on each half of the wing. And the wing half with the lower effective aspect ratio will exhibit a lower coefficient of induced drag. Added wingtip extensions which are coplanar to the wing will also produce lift. Varying the planform by varying the coplanar winglet area on both wing halves during flight, provides control surfaces that can simultaneously produce lift and yaw. And if the wing and winglets are designed properly, then induced yaw of the winglet will meet or exceed the adverse yaw generated by the increase in wing area. Meeting or exceeding the adverse yaw removes the requirement of an aircraft to have a rudder to make a banked turn. FIG. 1 shows a schematic interpretation of the net induced drag differential using adjustable coplanar winglets.

Figure 2:
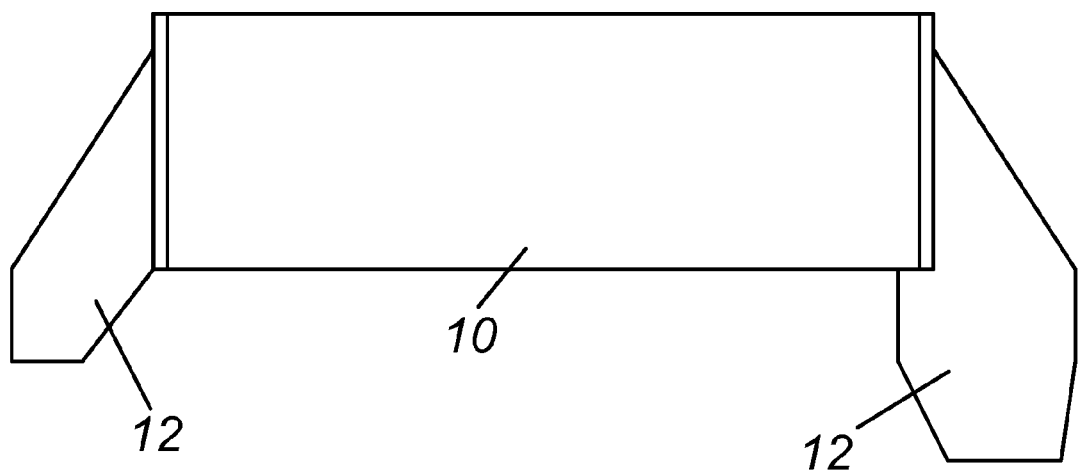
FIG. 2 is a top view of a wind tunnel model according to the present invention.
Figure 3:
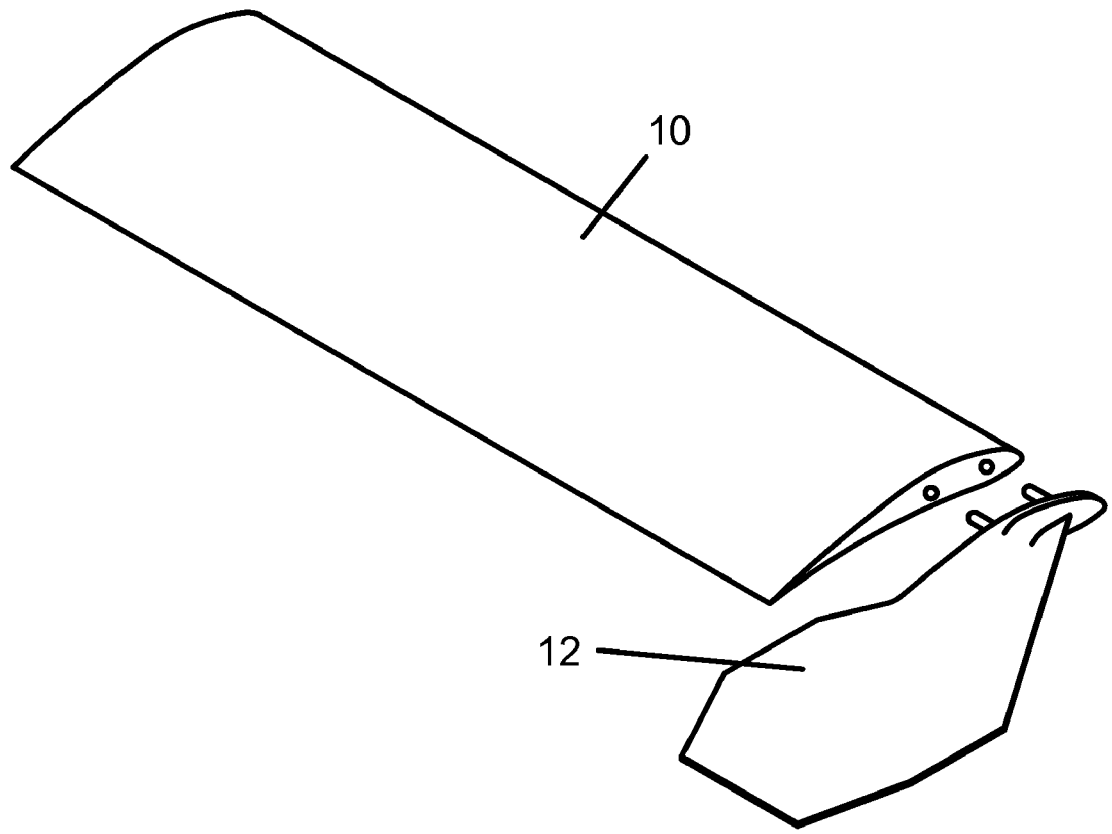
FIG. 3 is a perspective exploded view of a wind tunnel model of FIG. 2 according to the present invention.
Figure 4:
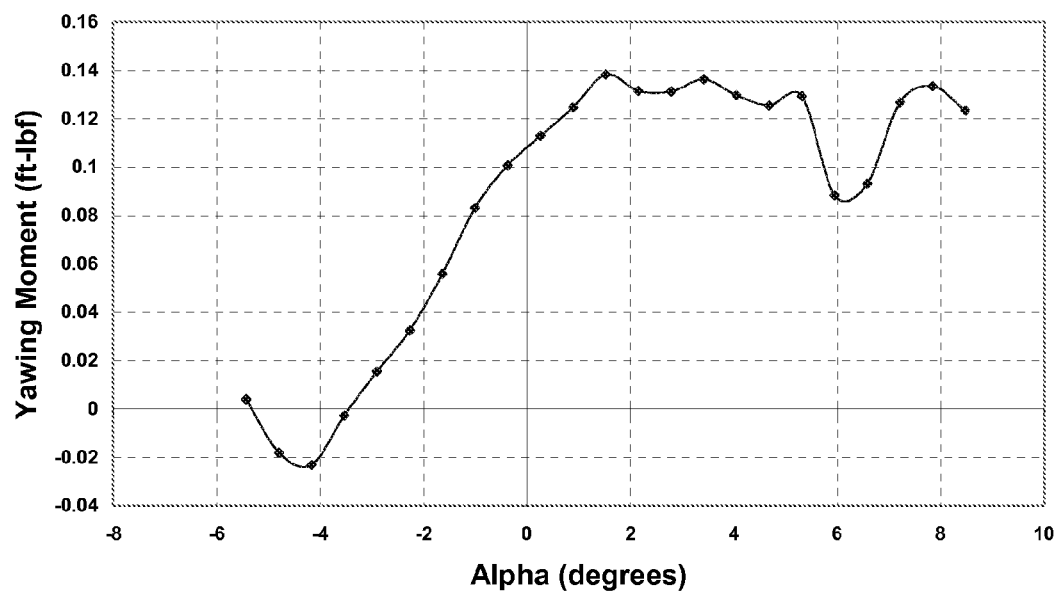
FIG. 4 is plot of yaw moment of the wind tunnel model of FIG. 2 according to the present invention.
Figure 5:
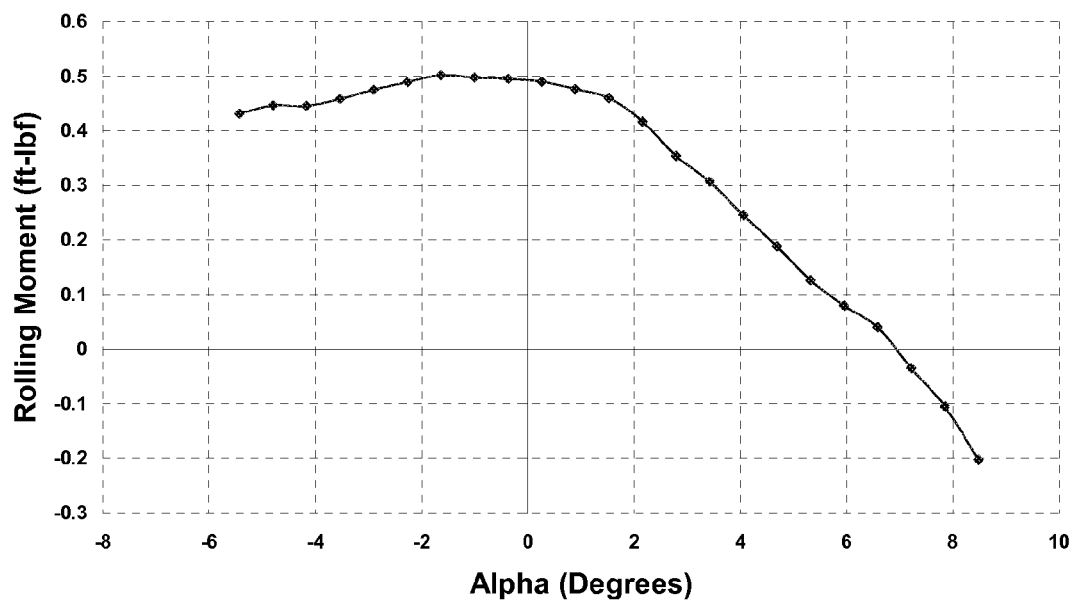
FIG. 5 is plot of roll of the wind tunnel model of FIG. 2 according to the present invention.

To test the effect of induced yaw, a wind tunnel model was designed and constructed based on the above concept of asymmetric winglets to turn an aircraft without a rudder. The wind tunnel model included a standard rectangular wing 10 and two detachable asymmetric winglets 12, 14 attached to the ends of the rectangular wing, as shown in FIGS. 2-3. The rectangular wing 10 is a single plywood high-lift rectangular airfoil. FIGS. 4-5 represent the measured yawing and rolling moments experienced by the wind tunnel model of FIGS. 2-3. The wind tunnel model was tested at fixed wind velocity of one-hundred-and-three (103) feet-per-second for different degrees of angle of attack (alpha). The data of FIG. 4 is the yawing moment experienced by the wind tunnel model at a velocity where positive values represent a rotation in the direction of the planned left turn. Referencing FIG. 2, the positive yawing moments would be acting in the counter clockwise direction. The data of FIG. 5 is the rolling moment experienced by the wind tunnel model at a velocity where positive values represent a roll in the direction of the planned left turn. Referencing FIG. 2, the positive rolling moments would represent a roll to the left, that is the left half or inboard wing section would dip while the right half or outboard wing section would rise. The data shows that it is possible to have a simultaneous increase in lift and reduction in drag on a given wing section. The data also demonstrates that an aircraft planform can be varied to produce disproportional induce drag and thus yaw across a 3-dimensional wing. Whereby, increasing the induced drag on the inboard wing section and decreasing the induced drag on the outboard wing section creates a wing which turns without the negative effects of adverse yaw.

Figure 6:
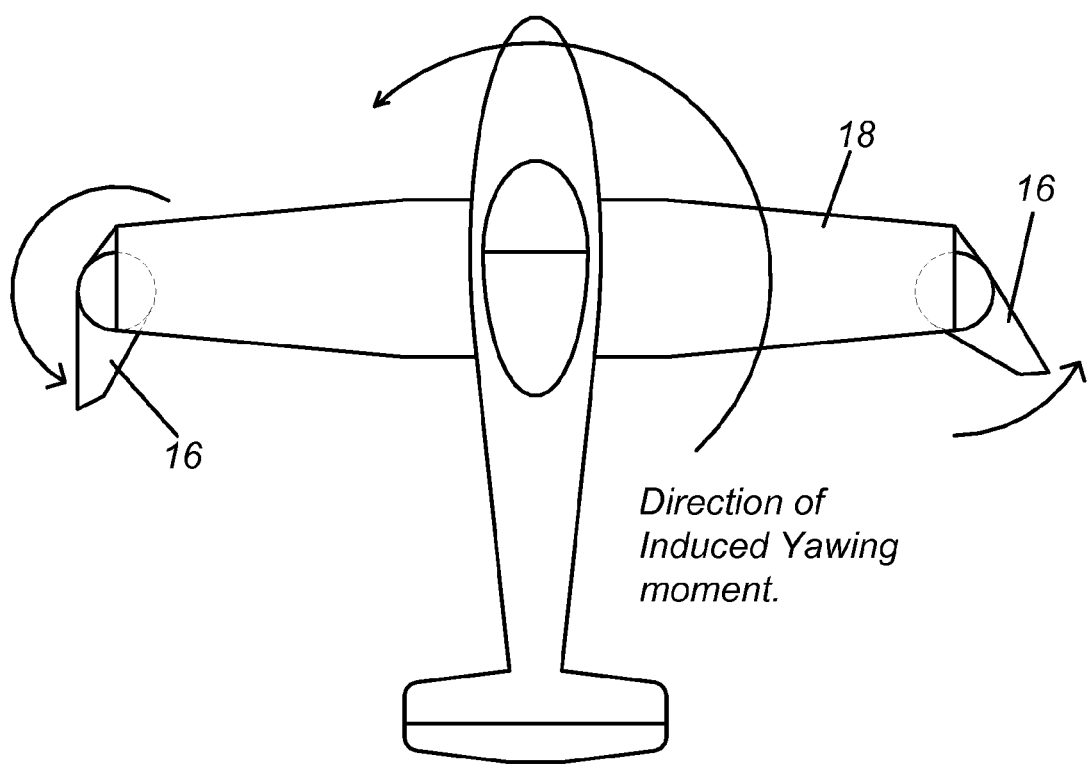
FIG. 6 is a schematic view articulating winglets according to the present invention.
Figure 7:
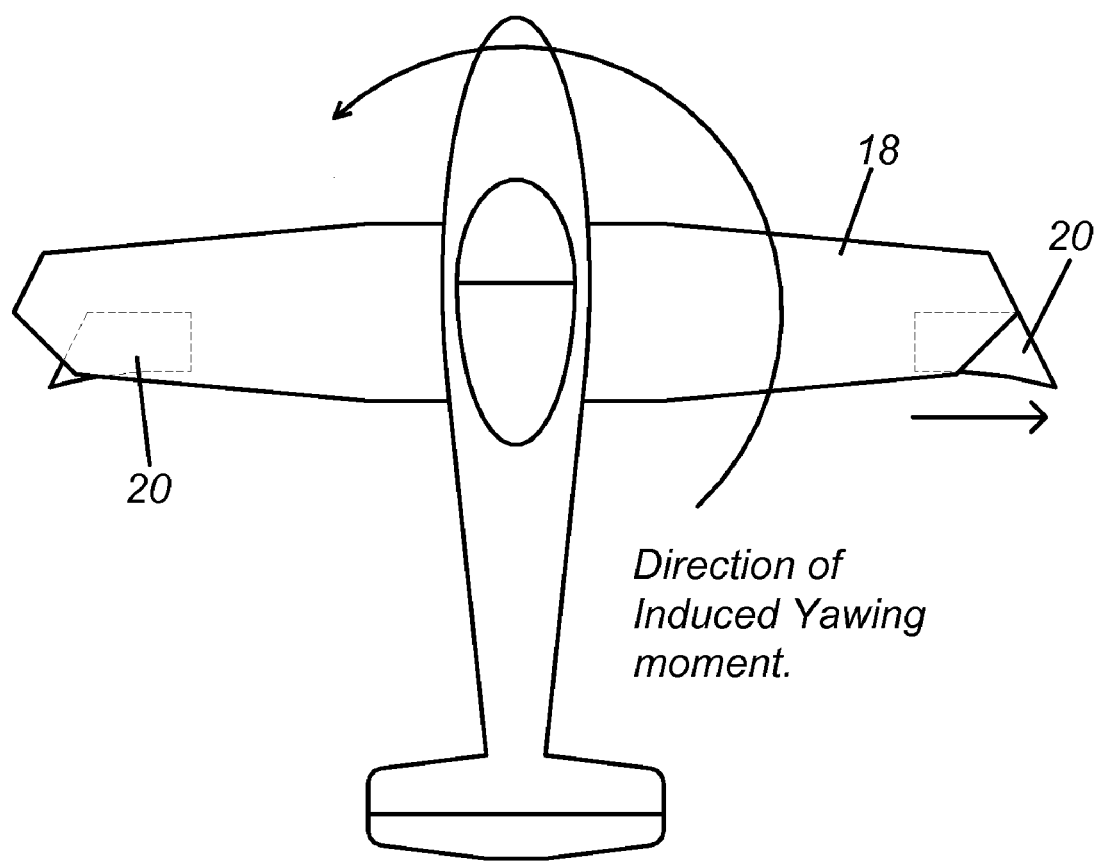
FIG. 7 is a schematic view articulating winglets according to the present invention.
Figure 8:
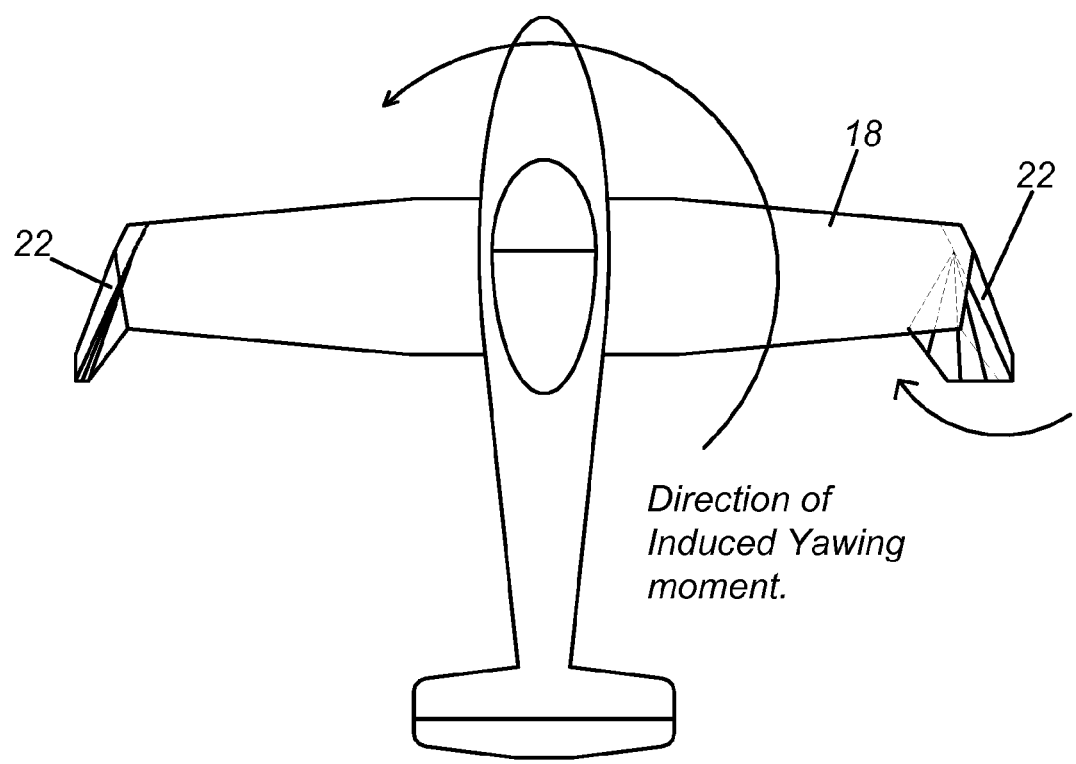
FIG. 8 is a schematic view articulating winglets according to the present invention.

FIGS. 6-8 schematically show a few examples of the possible solutions to providing articulating coplanar winglets to adjust the size of the winglets on both halves of the wing. FIG. 6 shows winglets 16 hinged to the ends of the wing 18, which rotate about the ends of wing 18. FIG. 7 shows telescoping winglets 20 at the ends of the wing 18, which move in and out of the wing 18. FIG. 8 shows winglets 22 which can fan out into a larger size at the ends of the wing 18. While different embodiments of the invention have been described in detail herein, it will be appreciated by those skilled in the art that various modifications and alternatives to the embodiments could be developed in light of the overall teachings of the disclosure. Accordingly, the particular arrangements are illustrative only and are not limiting as to the scope of the invention that is to be given the full breadth of any and all equivalents thereof.

I claim:

1. A method of controlling an aircraft in a turn without the use of rudder control by producing induced yaw, comprising: creating a net induced drag differential between an inboard wing to the turn and an outboard wing to the turn such that the induced drag experienced by the inboard wing is greater than the induced drag experienced by the outboard wing, the net induced drag differential being created in such a manner that the net induced differential overcomes increases in drag, that cause adverse yaw produced by the outboard wing.

2. The method of claim 1, further including:
   increasing the effective aspect ratio of the outboard wing to reduce downwash coming off the outboard wing and reduce the induced drag experienced by the outboard wing; and
   decreasing the effective aspect ratio of the inboard wing to increase downwash coming off the inboard wing and increase the induced drag experienced by the inboard wing.

3. The method of claim 1, further including:
   spoiling a tip vortex on the outboard wing to reduce downwash coming off the outboard wing and reduce the induced drag experienced by the outboard wing; and
   increasing a tip vortex on the inboard wing to increase downwash coming off the inboard wing and increase the induced drag experienced by the inboard wing.

4. The method of claim 3, further including:
   spoiling a tip vortex on the outboard wing to reduce downwash coming off the outboard wing and reduce the induced drag experienced by the outboard wing; and
   increasing a tip vortex on the inboard wing to increase downwash coming off the inboard wing and increase the induced drag experienced by the inboard wing.

5. The method of claim 3, further including providing adaptive control surfaces as part of the inboard and outboard wings to form a variable planform to affect the tip vortex and induced drag of each of the inboard and outboard wings and produce the net induced drag differential to overcome adverse yaw produced by the outboard wing.

6. The method of claim 4, further including providing adaptive control surfaces as part of the inboard and outboard wings to form a variable planform to affect the tip vortex and induced drag of each of the inboard and outboard wings and produce the net induced drag differential to overcome adverse yaw produced by the outboard wing.

7. The method of claim 3, further including providing adaptive control surfaces which are adjustable coplanar winglets on ends of each of the inboard and outboard wings, the coplanar winglets being independently adjustable in area size on the ends of each of the inboard and outboard wings; increasing the area size of the coplanar winglet on the outboard wing to increase effective aspect ratio of the outboard wing to lower the induced drag coefficient and the induced drag experienced by the outboard wing; and decreasing the area size of the coplanar winglet on the inboard wing to lower the effective aspect ratio of the inboard wing to increase the induced drag coefficient and the induced drag experienced by the inboard wing.

8. The method of claim 4, further including providing adaptive control surfaces which are adjustable coplanar winglets on ends of each of the inboard and outboard wings, the coplanar winglets being independently adjustable in area size on the ends of each of the inboard and outboard wings; increasing the area size of the coplanar winglet on the outboard wing to increase effective aspect ratio of the outboard wing to lower the induced drag coefficient and the induced drag experienced by the outboard wing; and decreasing the area size of the coplanar winglet on the inboard wing to lower the effective aspect ratio of the inboard wing to increase the induced drag coefficient and the induced drag experienced by the inboard wing.

9. The method of claim 8, further including providing coplanar winglets hinged to the ends of the inboard and outboard wings, whereby the coplanar winglets rotate about the ends of the inboard and outboard wings.

10. The method of claim 8, further including providing telescoping coplanar winglets at the ends of the inboard and outboard wings, whereby the coplanar winglets move in and out of the ends of the inboard and outboard wings.

11. The method of claim 8, further including providing coplanar winglets at the ends of the inboard and outboard wings, whereby the coplanar winglets fan out into a larger size from the ends of the inboard and outboard wings.

12. Flight control device comprising:
a coplanar winglet on an end of an outboard wing of an aircraft in a turn;
a coplanar winglet on an end of an inboard wing of an aircraft in the turn; and
said coplanar winglets configured to be independently adjustable in area size on said ends of each of said inboard and outboard wings to increase said area size of said coplanar winglet on said outboard wing to increase effective aspect ratio of said outboard wing in order to lower induced drag coefficient and induced drag experienced by said outboard wing and to decrease said area size of said coplanar winglet on said inboard wing to lower effective aspect ratio of said inboard wing to increase induced drag coefficient and induced drag experienced by the inboard wing.

13. The flight control device of claim 12, wherein said coplanar winglets are hinged to said ends of said inboard and outboard wings, whereby said coplanar winglets rotate about said ends of said inboard and outboard wings.

14. The flight control device of claim 12, wherein said coplanar winglets are telescoping coplanar winglets at said ends of said inboard and outboard wings, whereby said coplanar winglets move in and out of said ends of said inboard and outboard wings.

15. The flight control device of claim 12, wherein said coplanar winglets are fanned articulated surfaces to fan out into a larger size from said ends of said inboard and outboard wings.

* * * * *